US012423983B2

(12) United States Patent
Loeshelle

(10) Patent No.: US 12,423,983 B2
(45) Date of Patent: Sep. 23, 2025

(54) INTELLIGENT PAUSING OF RECORDING BY A PROPERTY MONITORING SYSTEM

(71) Applicant: Alarm.com Incorporated, Tysons, VA (US)

(72) Inventor: Joel Loeshelle, Arlington, VA (US)

(73) Assignee: Alarm.com Incorporated, Tysons, VA (US)

( * ) Notice: Subject to any disclaimer, the term of this patent is extended or adjusted under 35 U.S.C. 154(b) by 922 days.

(21) Appl. No.: 17/553,135

(22) Filed: Dec. 16, 2021

(65) Prior Publication Data
US 2022/0222943 A1 Jul. 14, 2022

Related U.S. Application Data

(60) Provisional application No. 63/135,787, filed on Jan. 11, 2021.

(51) Int. Cl.
*G08B 13/196* (2006.01)
*G06V 10/74* (2022.01)
*G06V 20/00* (2022.01)
*G06V 20/40* (2022.01)
*G06V 20/52* (2022.01)
*G06V 40/10* (2022.01)
*G06V 40/20* (2022.01)
*G08B 21/18* (2006.01)

(52) U.S. Cl.
CPC ............ *G06V 20/52* (2022.01); *G06V 10/761* (2022.01); *G06V 20/35* (2022.01); *G06V 40/10* (2022.01); *G06V 40/20* (2022.01); *G08B 21/182* (2013.01)

(58) Field of Classification Search
None
See application file for complete search history.

(56) References Cited

U.S. PATENT DOCUMENTS

| | | | |
|---|---|---|---|
| 10,043,360 B1 * | 8/2018 | Mullins | G08B 13/1968 |
| 10,204,275 B2 * | 2/2019 | Shin | H04N 7/183 |
| 11,430,260 B2 * | 8/2022 | el Kaliouby | G06V 40/10 |
| 2016/0140818 A1 * | 5/2016 | Viviani | G08B 29/188 |
| | | | 348/143 |
| 2020/0327315 A1 * | 10/2020 | Mullins | G08B 13/19615 |

FOREIGN PATENT DOCUMENTS

| | | | |
|---|---|---|---|
| CN | 103561177 A | * | 2/2014 |
| CN | 206369117 U | * | 8/2017 |
| CN | 115250318 A | * | 10/2022 |

* cited by examiner

Primary Examiner — Mohammed Rachedine
(74) Attorney, Agent, or Firm — Fish & Richardson P.C.

(57) ABSTRACT

Methods and systems including computer programs encoded on a computer storage medium, for receiving a first video clip indicative of an event from a camera, determining a category for the first video clip, determining a difference threshold based on the category of the first video clip, receiving a second video clip from the camera, determining a difference score for the first video clip and the second video clip, and in response to determining that the difference score for the first video clip and second video clip meets the difference threshold, providing an alert.

19 Claims, 3 Drawing Sheets

INTELLIGENT PAUSING OF RECORDING BY A PROPERTY MONITORING SYSTEM

CROSS-REFERENCE TO RELATED APPLICATIONS

This application claims the benefit of U.S. Provisional Application No. 63/135,787, filed Jan. 11, 2021, which is incorporated by reference in its entirety.

TECHNICAL FIELD

This disclosure application relates generally to intelligent surveillance systems.

BACKGROUND

For a residential-based commercial intelligent surveillance system, unnecessary alerts can incur costs associated with providing the unnecessary alerts to a user and can affect a user's receptiveness to receiving alerts when alerts contain information of low usefulness to the user. Moreover, a camera can repeatedly capture and detect a particular low priority event and utilize a system quota for processing and providing alerts based on the low priority event.

SUMMARY

Techniques are described for utilizing a machine-learned model to determine whether to send an alert to a user to notify the user of a possible event in a captured video from a camera. The machine-learned model determines to send the alert based on a determination that the captured video is sufficiently different from a reference video representative of the event.

An action captured by a video representative of an event, e.g., a reference video, can be extracted and categorized into a type of action, human/object pair, or the like. A difference threshold can be determined for the reference video based on the category of the action, where the difference threshold sets a minimum difference score between the contents of the reference video and contents of a second captured video in order for the system to provide an alert to the user based on the second video. In other words, the system can determine if the actions captured in subsequent videos are substantially different the reference video that the subsequent videos can be representative of a new event that is of interest to the user.

In particular, techniques are described for utilizing a trained machine-learned model to extract features from a video provided by a camera, determine an action captured by the video based on the extracted features, categorize the video based on the action, and compare the video to a reference video for an event to determine if the video meets a difference threshold from the reference video.

Implementations of the described techniques can include hardware, a method or process implemented at least partially in hardware, or a non-transitory computer-readable storage medium encoded with executable instructions that, when executed by a processor, perform operations.

Particular embodiments of the subject matter described in this specification can be implemented so as to realize one or more of the following advantages. By determining whether or not a video captured by a camera includes a sufficiently different action from a reference video of an event, a number of alerts provided to a user can be reduced. Reducing a number of alerts being provided can reduce use of network bandwidth to provide alerts and can reduce a data usage/cost for providing SMS/text-based alerts. Additionally, reducing a number of similar alerts, that is, alerts that are related to a same event but without indicating a substantial difference in the event, can result in each alert received having an increased impact on the user. In other words, that the user is more likely to find the alerts more meaningful. Categorizing a reference video by an action captured in the reference video and further assigning a difference threshold to the reference video can set a sensitivity for the system to determine whether to provide a captured video from the camera, and can result in high risk actions causing the system to provide more alerts, e.g., the presence of a stranger circling a property, and low risk actions causing the system to provide fewer alerts, e.g., the homeowner sitting on the porch.

The details of one or more implementations are set forth in the accompanying drawings and the description below. Other features will be apparent from the description and drawings, and from the claims.

DETAILED DESCRIPTION

Techniques are described for utilizing a machine-learned model to determine whether to send an alert to a user to notify the user of a possible event in a captured video from a camera based on a determination that the captured video is sufficiently different from a reference video representative of the event. A machine-learned model can be trained using ground truth videos that are categorized as representative of different actions, e.g., standing, walking, grilling, burglarizing, reducing the need of a human expert labeling of events. The machine-learned model can be further refined by collected videos from the particular camera system, such that the model can be trained to differentiate between high-risk categories of actions and low-risk categories of actions specific to the particular camera or camera system, which can in turn inform a threshold of difference to use between a reference video and new videos being processed by the system.

Figure 1:
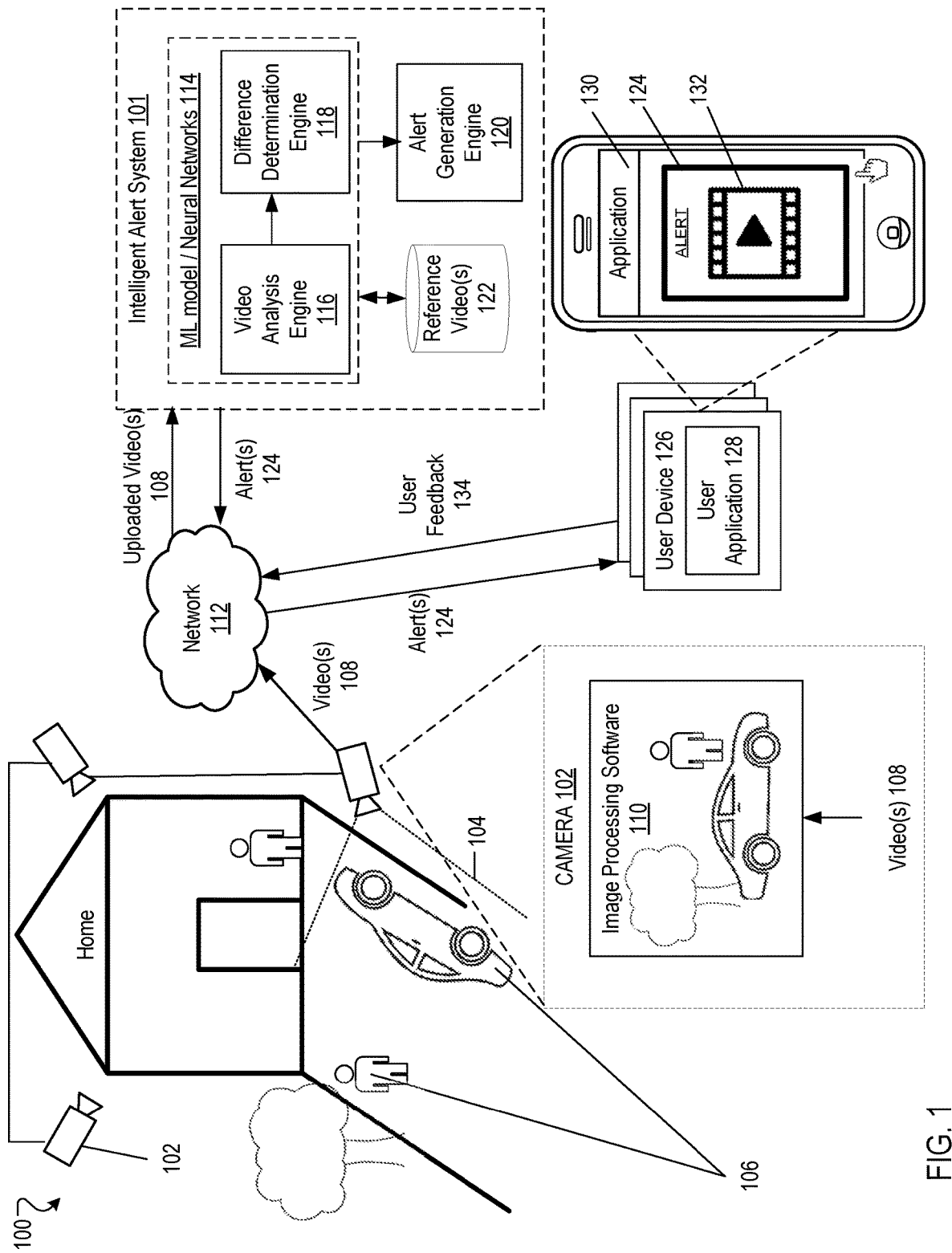
FIG. 1 illustrates an example operating environment for an intelligent alert system.

FIG. 1 illustrates an example operating environment 100 for an intelligent alert system 101. One or more cameras 102 are installed as a part of a video monitoring system, e.g., a residential-based or small business-based commercial video surveillance system. Camera 102 can include a surveillance camera, night-vision camera, infrared camera, or the like. Camera 102 can be installed indoors or outdoors.

In some implementations, camera 102 can record the environment within its respective field of view 104 continuously and can detect objects 106 in the captured video 108. In particular, an object 106 of interest can be a human, vehicle, or animal target, however, multiple different objects 106 can trigger a detection of an object 106 in the field of view 104 of the camera 102. For example, for outdoor scenes including humans, animals, and human/object pairs, e.g., person holding ball, person drinking from a cup, etc., can all trigger detection of an object 106 in the field of view 104 of the camera 102. In another example, for indoor scenes, light change (e.g., lights turning on), pets, and humans can all trigger detection of an object 106 in the field of view 104. In the case in which the camera 102 is not triggered to detect an object 106 within its field of view 104, the image detection software does not proceed to process a captured video 108.

In some implementations, camera 102 can record discontinuously and include one or more triggers (e.g., a movement trigger, sound trigger, and change in lighting trigger) for activating a recorded video and/or image. For example, a motion sensor can detect motion of an object 106 within the field of view 104 of the camera 102, and trigger capturing the environment in an image or video. In another example, camera 102 can automatically capture scheduled bursts of video and/or images within the field of view of the camera 102 (e.g., every 10 seconds, every 60 seconds, every 5 minutes, or the like).

Captured videos can be, for example, 10-60 second recordings, e.g., 30 second video clips. In some implementations, a camera 102 can record and provide a video to the system 101, e.g., a 30 second video capturing an event, and then pause for a set interval before it can provide another video to the system 101. For example, the camera 102 can record a video and pause for 2-10 seconds, e.g., 5 seconds, before it can send another video. During the paused interval, the camera 102 does not upload videos to the system 101. Videos recorded during the paused interval may or may not be saved in a permanent storage, e.g., at a cloud-based server, local storage, or the like.

In some implementations, a length of the set interval can be determined based in part on a time required by the intelligent alert system 101 to decide if a previously provided video will result in an alert being sent to the user.

Videos 108 captured by the camera 102 can be processed by image processing software 110 on the camera 102. In some implementations, the image processing software 110 includes a classifier to identify and classify object 106 as a class of object. For example, a class of object 106 can include human, animal, vehicle, vessels, bug, nature, or the like. For each class of object, the image processing software 110 can include a database of physical properties of the class of object (e.g., size, speed, relative locations of features, etc.). In some implementations, a mapping between image and world coordinates can be used to create a database which stores average features of various objects (e.g., average human feature locations and size) to assist in object classification. For example, the image processing software 110 can include a database of human targets, including average human target size (e.g., a size of bounding box containing a human target).

In some implementations, object classification using the image processing software 110 can include one or more object models (e.g., human model, animal model, vehicle model) that include information related a respective object 106 (e.g., a human target, animal, vehicle). An object model can include information related to object size/dimensions, locations of one or more features, movement speed, or the like. For example, a human model can include information about average human height and relative locations of a human target's head and foot position.

Video 108 including an object 106 can be processed by the image processing software 110 and object 106 can be classified as a target of interest (e.g., a human target, a vehicle target, etc.). In some implementations, the identification of a human target in video 108 results in the video 108 being uploaded to the intelligent alert system 101 via a network 112. The network 112 can be, for example, a local area network (LAN), the Internet, or a combination thereof that connects the camera 102 and the intelligent alert system 101. The intelligent alert system 101 can be hosted on one or more servers, e.g., cloud-based servers, and communicates with the camera 102 via network 112.

In some implementations, camera 102 provides every video 108 captured by the camera where the image processing software 110 on the camera 102 determines a positive detection of an object 106 or action of interest. In one example, a positive detection can include a detection of an object 106 of interest located within a field of view of the camera 102, e.g., a person walking into the field of view of the camera, a car in a field of view of the camera, etc. In another example, a positive detection can be a detection of motion within the field of view of the camera 102.

Image processing software 110 loaded on camera 102 can be utilized to detect objects and/or actions, e.g., using bounding boxes, human/object models, or other techniques, in videos 108 captured by the camera 102. The camera 102 can determine whether a video 108 includes a detected object/human and/or action captured within the video 108 and provide the video to the intelligent alert system 101 in the case where the video 108 is determined to include an object/human and/or action.

Camera 102 provides videos 108 to the intelligent alert system 101 as input. The intelligent alert system 101 includes one or more machine-learned models and/or neural networks 114 that can perform one or more of the actions described herein with reference to the intelligent alert system 101. The intelligent alert system 101 can include a video analysis engine 116, a difference determination engine 118, and an alert generation engine 120. Though described herein as a video analysis engine 116, a difference determination engine 118, and an alert generation engine 120, the intelligent alert system 101 can include more or fewer engines that perform the actions described.

The intelligent alert system 101 can receive videos 108 from a camera 102 via the network 112, as input. The video analysis engine 116 can analyze, utilizing machine-learned model 114, the video 108 and extract human/object pairs, e.g., using facial recognition and/or object recognition processing, and actions captured within the video 108. In some implementations, the video analysis engine 116 can extract human/object pairs, e.g., man holding cup, child playing with a ball, etc. from the video 108. Generally, a human/object pair represents a detected human holding, moving, or otherwise interacting with an object. For example, "person/cup," "person/package," "person/ball." The machine-learned model 114 can be trained to recognize human/object pairs and differentiate between common and uncommon human/object pairs. An action can include a description of an action observed within the video, performed by a human, animal, vehicle, etc. For example, an action can be "car pulling into driveway," "human walking across porch," or "dog running through backyard."

In some implementations, multiple classifiers including human classifiers, object classifiers, etc., can be utilized to label human/object pairs and actions in order to generate training data. By training the model with training data that includes human/object pairs and actions, the machine-learned model can learn what pairs and actions are "normal" and which are "abnormal."

The human/object pair can additionally be associated with an action, for example, human/ball pair where the action is "human throwing a ball" or "human catching a ball," where the human/object pair and action are determined as related. The machine-learned model 114 can be trained to recognize common actions associated with human/object pairs.

Machine-learned model 114 can utilize pre-trained human or object models to recognize humans and objects captured in the video 108. In some embodiments, the intelligent alert system 101 generates human or object models of known humans, e.g., a homeowner, and known objects, e.g., a grill, in order to recognize known humans/objects captured in the video 108.

In some implementations, machine-learned model 114 is trained utilizing expert-labeled training data including labeled video clips capturing a plurality of human/object pairs and actions, e.g., someone sitting outside, a person grilling, a person burglarizing, a party, a person playing with a pet, etc. The training data can be additionally categorized based on the action and/or human/object pairs captured in the videos in an automated or semi-automated manner. The expert-labeled training data can further identify "common" and "uncommon" human/object pairs and actions, where the training data can be labeled with risk/priority levels for each of the identified human/object pairs and actions. For example, expert-labeled training data can identify "person/cup" as a low-risk/common pair and "person/package" as a high-risk/uncommon pair.

In some implementations, a machine-learned model can be trained using unsupervised or semi-unsupervised learning with historical videos captured by the camera to learn normal behavior patterns for the camera, e.g., a driveway-facing camera will normally record the homeowner's vehicle pulling in/out of the driveway, such that the machine-learned model can compare a new video captured by the camera to past behavior patterns and identify abnormal human/object pairs and actions.

The videos utilized in the training data can be categorized and difference thresholds can be assigned to the ground truth labeled videos, e.g., by human experts. Difference thresholds can be assigned by assigning priority level to categories of videos, in other words, videos can be categorized by action and by risk/priority level (e.g., high risk, low risk). For example, a video can be categorized as "person sitting outside," where the category of "person sitting outside" can be assigned a low risk priority by a human expert.

Risk/priority levels can be associated with a difference threshold or a range of risk/priority levels can be associated with a difference threshold. A range including multiple risk/priority levels, e.g., ratings of 1-3 on a scale of 10, can be associated with a particular difference threshold, e.g., by a human expert, where a same difference threshold is assigned to each video categorized within the range of risk/priority levels. For example, the actions of a "person sitting outside," "person playing with dog," and "person grilling" can each be assigned a respective risk/priority level between 1-3 on a scale of 10, and as result, each of the actions have a same difference threshold for triggering an alert.

In some implementations, a difference threshold for a particular risk/priority level can differ, for example, based on additional factors. Additional factors can include, for example, environmental context (e.g., weather, season, time of day), user action (e.g., occupancy of the home), or the like. In one example, an unoccupied home may lower the difference threshold for a low risk level, such that a low risk action may trigger alerts for small differences.

Expert-labeled training data can include pairs of videos, e.g., a reference video and a new video, where the differences between the videos are labeled and where a difference score is assigned to the differences between the reference video and new video. In some implementations, risk/priority levels can be cumulative for multiple categories of actions and human/object pairs captured by a video. For example, a video including multiple human/object pairs and/or actions can have an assigned risk/priority level that is a sum of the individually determined risks/priority levels.

In some implementations, risk/priority levels of a video can depend on a highest risk/priority level for an action/human-object pair captured in a video (e.g., a low priority action and a high priority action in a same video will result in a high priority assignment to the video).

In some implementations, expert-labeled training data can include actions or human/object pairs that are labeled as "normal" and "abnormal" for a particular camera or in general. For example, a set of human/object pairs can be labeled as "normal" for a camera with a field of view of a driveway, e.g., homeowner/homeowner's car, homeowner/pet, etc. In another example, a set of actions can be labeled as abnormal for the camera, e.g., "delivery truck pulling into driveway," "package delivery."

The machine-learned model 114 is trained using the ground truth training data that is representative of categories of actions, e.g., normal vs abnormal activities, normal vs abnormal human/object pairs. The model 114 can be further refined using camera-specific or location-specific data, where a user can provide user feedback for videos captured by a particular camera, e.g., "that's me grilling" or "that's my family eating dinner outside" such that the model can be refined using this location-specific training data. Further discussion of user feedback is found below.

In some implementations, the model 114 is refined using pattern recognition, e.g., where a camera 102 captures video of a same activity at a regular interval (e.g., a dog goes out to the backyard every morning, homeowner grills every Friday afternoon, etc.).

Location-specific data can include building human/object models to recognize particular humans, (e.g., people who live at the home, common objects for the home), which can be used to train the model to recognize common humans/objects that may be specific to the home, e.g., the homeowner, a pet, etc.

Multiple classifiers of the video analysis engine 116 process the extracted human/object pairs and actions from the video 108 to classify the human/object pairs and actions each into a respective category of multiple categories. Categories of actions can include types of activities captured in the video, e.g., eating, partying, grilling, playing, sitting, etc. In one example, a video 108 can be categorized as "person sitting." Multiple actions can be identified within a video 108, where distinct categories of actions can be identified. For example, a video 108 can include an action of "person opening front door" and "person sitting in chair."

In some implementations, classifying the human/object pairs and actions can include classifying the human/object pairs and actions by an associated risk level or priority level of the human/object pair or action. For example, a homeowner standing at a grill can be classified as a low risk level (e.g., representative of a mundane event). In another example, an unknown person circling the home can be classified as a high risk level (e.g., a possible intruder to the home).

Based on one or more determined categories of the video and the identified human/object pairs and/or identified actions, the video 108 is identified as representative of an event such that the intelligent alert system 101 designates video 108 as a reference video 122 for the event. The intelligent alert system 101 additionally sets a difference threshold for the event. The difference threshold can depend in part on a category of the actions, human/object pairs, or a combination thereof that are identified in the reference video 122. The difference threshold represents a measure of difference between actions and/or human/object pairs identified in subsequent videos relative to the reference video 122 and represents an amount of change detected in a scene captured within the field of view 104 of the camera 102. In one example, a difference between actions and/or human/object pairs can be a vehicle that is parked in a driveway in a reference video 122 and a subsequent video depicting the vehicle moving or absent from the driveway.

The machine-learned model 114 can assign the difference threshold for the reference video, where the machine-learned model 114 is trained using ground truth labeled video data including various actions/human-object pairs and which are expert-labeled with risk levels.

Intelligent alert system 101 can set the difference threshold to a first measure for a category that is high-risk and set to a second measure for a category that is low-risk. In some implementations, a difference threshold for a high-risk category can be set lower than a difference threshold for a low-risk category. For example, a difference threshold can be set to a first, low threshold of difference for a high-risk category that is "unknown person on front porch" and the difference threshold can be set to a second, high threshold of difference for a low-risk category that is "homeowner on front porch," where an amount of difference between the reference video 122 and subsequent videos 108 to trigger an alert is dependent on the difference threshold. In other words, for a first low threshold of difference assigned to a high-risk category, small changes in the scene detected in subsequent videos when compared to the reference video 122 can trigger an alert from the intelligent alert system 101.

In some implementations, a difference threshold for a video is a cumulative value based on each human/object and action identified within a video. For example, a difference threshold for a video including a categorized high-risk priority action and a low-risk priority action can have a difference threshold that is equal to a sum of the respective difference thresholds for each of the high-risk priority action and the low-risk priority action.

In some implementations, a difference threshold for a video is assigned based on a highest-risk/priority level of the video. In other words, a video may include multiple actions of differing categories and resulting risk/priority level, such that a difference threshold for the video is selected based on a highest-risk/priority level. For example, a video includes a person sitting and a child swimming in a pool. The difference threshold is assigned based on a difference threshold for the risk level (e.g., high risk) assigned to the category of the action "child swimming in pool."

In some implementations, multiple difference thresholds for a video can be assigned to respective human/object and actions identified within a video, where changes to each of the human/object and actions identified are independently evaluated by the system 101 to determine if particular difference threshold is met to trigger an alert.

Difference determination engine 118 receives the reference video 122 of the event and difference threshold for the reference video 122. The intelligent alert system 101 receives a new, subsequent video 108. The video analysis engine 116 extracts human/object pairs and/or actions captured within the subsequent video utilizing the machine-learned model 114. Difference determination engine 118 compares the extracted human/object pairs and/or actions from the subsequent video with the extracted human/object pairs and/or actions from the reference video 122 to determine a difference score utilizing the machine-learned model 114.

A difference score can be determined by comparing actions and/or human/object pairs appearing in the reference video and the new video. Utilizing image processing software, e.g., facial recognition software, object recognition software, to determine if an action has changed and/or if the human is different and/or if the human/object pair is different from the reference video to the new video. For example, the homeowner can appear in the reference video where the homeowner is grilling. A subsequent video can include the homeowner grilling and a second new human holding a plate. In another example, the reference video can include a homeowner sitting at a table and a new video can include the homeowner standing at a grill. The difference score can be calculated based on the appearance of a new human and new human/object pair in the new video.

Machine-learned model 114 is trained to identify degrees of difference between human/object pairs and actions, such that the system 101 can quantify a difference observed between a new video and the reference video and determine with the difference meets or exceeds the assigned difference threshold for the reference video. The machine-learned model 114 is trained to infer which differences observed between human/object pairs and actions are significant (e.g., "abnormal") and which are insignificant (e.g., "normal").

In some implementations, a difference score can be a combination of sub-scores for the extracted human/object pairs, actions etc. Each difference sub-score is determined between the action and/or human-object pairs in the reference video and the new, subsequent video, where the difference score can reflect an associate risk level associated with a type or category of each difference.

In some implementations, the difference determination engine assigns a first difference score can be assigned to a new human in the new video that is unknown, e.g., a large difference score, and assigns a second difference score to a new human in the new video that is a known human (a resident of the home), e.g., a small difference score.

In some implementations, the difference determination engine assigns a first difference score can be assigned if a new human appears in the new video, and assigns a second difference score if the homeowner is interacting with a new object (e.g., a new action and/or new human/object pair).

In some implementations, the subsequent video is categorized by the machine-learned model 114, e.g., the human/object pairs and/or actions are assigned categories, such that the category of the subject video is used by the difference determination engine 118 to determine a difference score for the subsequent video.

The difference determination engine 118 compares the difference score for the new video to the difference threshold value for the reference video 122. If the difference score for the new video does not meet the difference threshold, then the new video is discarded or otherwise does not result in the system proceeding to alert the user regarding the new video.

In some implementations, the difference determination engine 118 compares difference scores for respective human/object pairs or actions within a single new video to determine if each difference score meets a respective difference threshold.

If the difference determination engine 118 determines that the difference score for the new video meets or exceeds the difference threshold, then the intelligent alert system 101 will proceed to generating an alert 124 responsive to the new video. In other words, if the new video is determined to capture sufficiently different actions, human/object pairs then the system will send an alert 124 to a user, e.g., homeowner or other interested party, that a new event has been detected in the field of view of the camera 102.

Additionally, if the difference determination engine 118 determines that the difference score for the new video meets or exceeds the difference threshold, then the intelligent alert system 101 will set the new, subsequent video as the new reference video 122 for the camera 102 for future received videos. In other words, a next received video from the camera 102 will be compared to the new reference video.

In some implementations, alternatively/additionally, the difference determination engine 118 may compare a new video to historical patterns observed in the field of view of the camera. In other words, human/object pairs and actions may be evaluated as "normal" or "abnormal" for the particular camera based on observed behavior patterns for the particular camera. For example, a mail truck delivering mail regularly within a time window on a daily basis can be an established pattern to which a video including "mail truck at mailbox" may be compared to determine if an alert is triggered.

Alert generation engine 120 can generate and provide an alert 124 to a user device 126. Alert 124 can be displayed in an application environment 128 of a user application, e.g., a home security application, on the user device 126. Alert generation engine 120 can additionally or alternatively provide alert 124 as a text/SMS message, a phone call (e.g., a robo-call), via electronic messaging system (e.g., email), a pop-up window on the user device 126, or the like. In some implementations, alert 124 can be an audio/visual alert to a virtual assistant device.

Alert 124 can include imaging data, e.g., a video clip and/or still images, of a video 108 including human/objects and/or actions that triggered the alert 124. For example, a subsequent video including a new vehicle in the driveway has an assigned difference score exceeding a difference threshold such that the intelligent alert system 101 generates an alert 124, the alert 124 can include a frame capturing the new vehicle.

In some implementations, a user receiving the alert 124 can provide feedback 134 to the intelligent alert system 101. Feedback 134 can include the user affirming or denying the new video captures a new event. For example, a user can provide feedback to the system that a new clip provided in an alert captures a same event, e.g., user is grilling in the backyard. In some implementations, a user providing feedback can select to "snooze" or pause receiving alerts related to video from a particular camera, e.g., pause the system for 30 minutes, 1 day, 2 hours, etc.

In some implementations, a user receiving the alert can provide feedback to the intelligent alert system 101 that includes user-labeled action or human/object pairs. For example, a user can provide the system with a label for a video 108 "that's me sitting on my porch" or "that's the dog chasing a ball." The user-labeled action or human/object pairs can be utilized to refine the machine-learned model 114.

Figure 2:
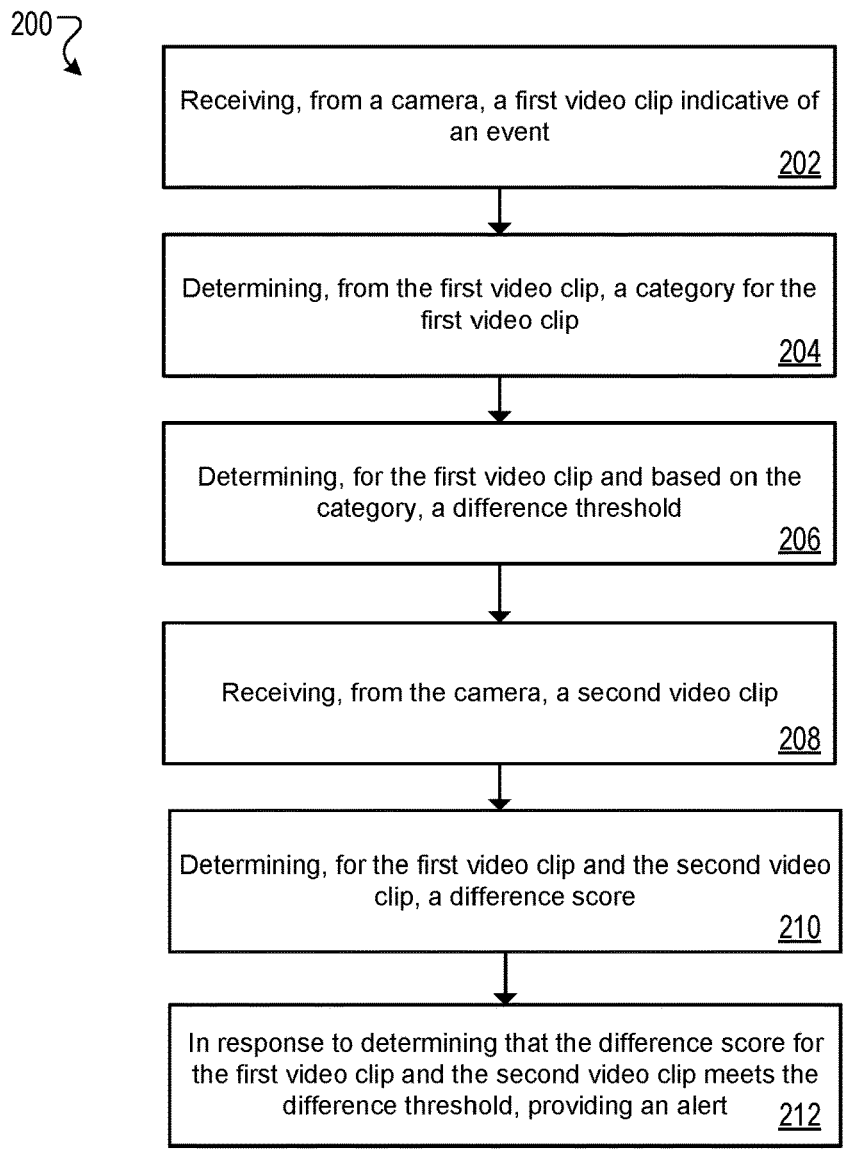
FIG. 2 is a flow diagram of an example process for the intelligent alert system.

FIG. 2 is a flow diagram of an example process of the intelligent alert system. A first video clip indicative of an event is received from a camera (202). Camera 102 captures videos of a scene within a field of view 104 of the camera. Image processing software 110 on camera 102 can process the video 108 and determine that the video includes a detection of an event. The camera 102 uploads video 108 to the intelligent alert system 101 via network 112. In some implementations, camera 102 can upload every video 108 captured by camera 102 to the intelligent alert system 101, where the intelligent alert system 101 can perform image processing to determine which of the uploaded videos 108 include a detection of an event.

A category for the first video clip is determined from the first video clip (204). The intelligent alert system 101 determines, using a machine learned model 114, a category for the video 108 received from the camera 102. Video analysis engine 116 can receive the video 108 as input, and extract one or more human/object pairs and/or actions depicted in the video 108 and categorize the extracted human/object pairs and/or action. A category for the video 108 can include a descriptive category, e.g., "grilling," "sitting," and the like. Each of the categories can be associated with a risk/priority level. Risk/priority levels can be binary, e.g., "high-risk" or "low-risk," or can include a scale with multiple designations, for example, numerical designation (e.g., 1-5), color designations (e.g., Red, Yellow, Green), or the like. For example, an action category of "grilling" can be associated with a risk/priority level of "low-risk," or "green," In another example, a human/object pair of "unknown person/package" can be associated with a risk/priority level of "high-risk" or "red."

In some implementations, determining, from the first video clip, a category for the first video clip includes determining an action being performed by a human in the first video clip and determining the category for the first video clip based on the action being performed by the human. For example, the video analysis engine 116 may determine that in a particular clip a human is grilling food on barbeque grill and, in response, determine a category of "grilling."

In some implementations, determining an action being performed by a human in the first video clip includes identifying a particular object in the first video clip, determining that the human is interacting with the particular object in the first video clip, and determining the action being performed by the human in the first video clip based on the particular object with which the human was determined to be interacting. For example, the video analysis engine 116 may identify a dog in a particular clip, determine that the human was petting the dog, and, based on determining that the human was petting the dog, determine that the human was performing the action of "playing with a dog."

A difference threshold is determined for the first video clip and based on the category (206). Machine learned model 114 can be trained on training data including a plurality of annotated video clips including labeled human/object pairs and actions, and for each of the human/object pairs and actions, categories with associated risk/priority levels. Categories can each be associated with a difference threshold, depending in part on the associated risk/priority levels. High risk human/object pairs and actions can be associated with relatively low difference threshold, where small changes in the scene captured by the camera 102 will trigger an alert response from the intelligent alert system 101. Low risk human/object pairs and actions can be associated with relatively high difference threshold, where small changes in the scene captured by the camera 102 will not trigger an alert response from the intelligent alert system 101. As described above with reference to FIG. 1, a difference threshold is assigned by the machine learned model 114 based on the one or more categories assigned to the first video clip 108.

In some implementations, determining, for the first video clip and based on the category, a difference threshold includes determining a risk level based on the category and determining the difference threshold based on the risk level. For example, the video analysis engine 116 may determine a category of "person sitting" for a video, determine a risk level of "low risk" from the category of "person sitting," and determine a difference threshold of 60% from the risk level of "low risk." In another example, the video analysis engine 116 may determine a category of "person running" for a video, determine a risk level of "medium risk" from the category of "person running," and determine a difference threshold of 40% from the risk level of "medium risk."

In some implementations, determining the difference threshold based on the risk level includes determining, from the first video clip, a second category for the first video clip, determining a second risk level based on the second category, and determining the difference threshold based on the risk level and the second risk level. For example, the video analysis engine 116 may determine a first category of "person sitting" for a video based on detecting a first person sitting in the video, determine a second category of "person running" for the video based on detecting a second person sitting in the video, determine a risk level of low for the first category and a risk level of medium for the second category results in a sum risk level of high, and determine a difference threshold of 20% based on the sum risk level of high.

The intelligent alert system 101 stores the first video clip 108 as a reference video 122, such that a subsequent video received from the camera 102 is compared to the reference video 122. Reference video 122 is stored with associated metadata, e.g., threshold difference, time of collection, categories, extracted human/object pairs and/or actions in the reference video 122.

A second video clip is received from the camera (208). Intelligent alert system 101 receives the second video clip from the camera 102 and utilizes machine learned model 114 to extract human/object pairs and/or actions captured in the video. The video analysis engine 116 assigns categories to the extracted human/object pairs and/or actions. In some implementations, the first video clip and the second video clip are both a predetermined duration. For example, the video clips may each be 30 seconds long.

A difference score is determined for the first video clip and the second video clip (210). Difference determination engine 118 determines a difference score between the human/object pairs and/or actions captured in the (first) reference video clip and the second video clip, and can assign a difference score to each human/object pair and action captured between the two clips. Differences can include new human/object pairs or actions and/or can include changes to human/object pairs or actions between the two clips. For example, a new person can appear in the second video clip. In another example, a same person can be identified in both clips but can be identified as interacting with a first object in the first video clip and a second, different object in the second video clip. In yet another example, a same person can be sitting in the first video clip and standing in the second video clip. Each difference detected by the machine learned model 114 is assigned a difference score, where a difference score for the first video clip and the second video clip can be cumulative.

Difference scores for changes to human/object pairs and actions between the two clips can be weighted more heavily than other changes, e.g., based on a risk/priority level of the category of the human/object pair or action that is impacted. For example, a package that appears in the second video clip that was not in the first video clip can have a difference score that is weighted more heavily than a homeowner that goes from sitting to standing between the first and second video clips.

In some implementations, determining, for the first video clip and the second video clip, a difference score includes determining that a human present in the second video clip was not present in the first video clip and based on determining that the human present in the second video clip was not present in the first video clip, determining the difference score. For example, the difference determination engine 118 may determine that a homeowner grilling in a reference video is not in a new video, that the new video instead shows a new human with a mask holding a gun and, in response, determine a difference score of 95%.

In some implementations, determining, for the first video clip and the second video clip, a difference score includes determining, from the second video clip, a second category for the second video clip and determining the difference score based on a difference between the category for the first video clip and the second category for the second video clip. For example, the difference determination engine 118 may determine that a category of "person playing with dog" for new video, and determine a difference score of 50% based on the category of "person playing with dog" for the new video being different from the category of "grilling" for the reference video.

In response to determining that the difference score for the first video clip and the second video clip meets the difference threshold, an alert is provided (212). Difference determination engine 118 determines that a difference score for the first and second video clips meets the difference threshold. Alert generation engine 120 can generate, based on the meeting of the difference threshold, an alert 124 to provide to a user, e.g., homeowner. The alert 124 can be provided by the intelligent alert system 101 to a user device 126, e.g., mobile phone, digital assistant, or the like. Alert 124 can include a video or still frame of the first and/or second video clips that triggered the alert 124. A user of the user device 126 can provide user feedback 134 in response to the alert, e.g., to snooze the alert, provide contextual details, etc.

Figure 3:
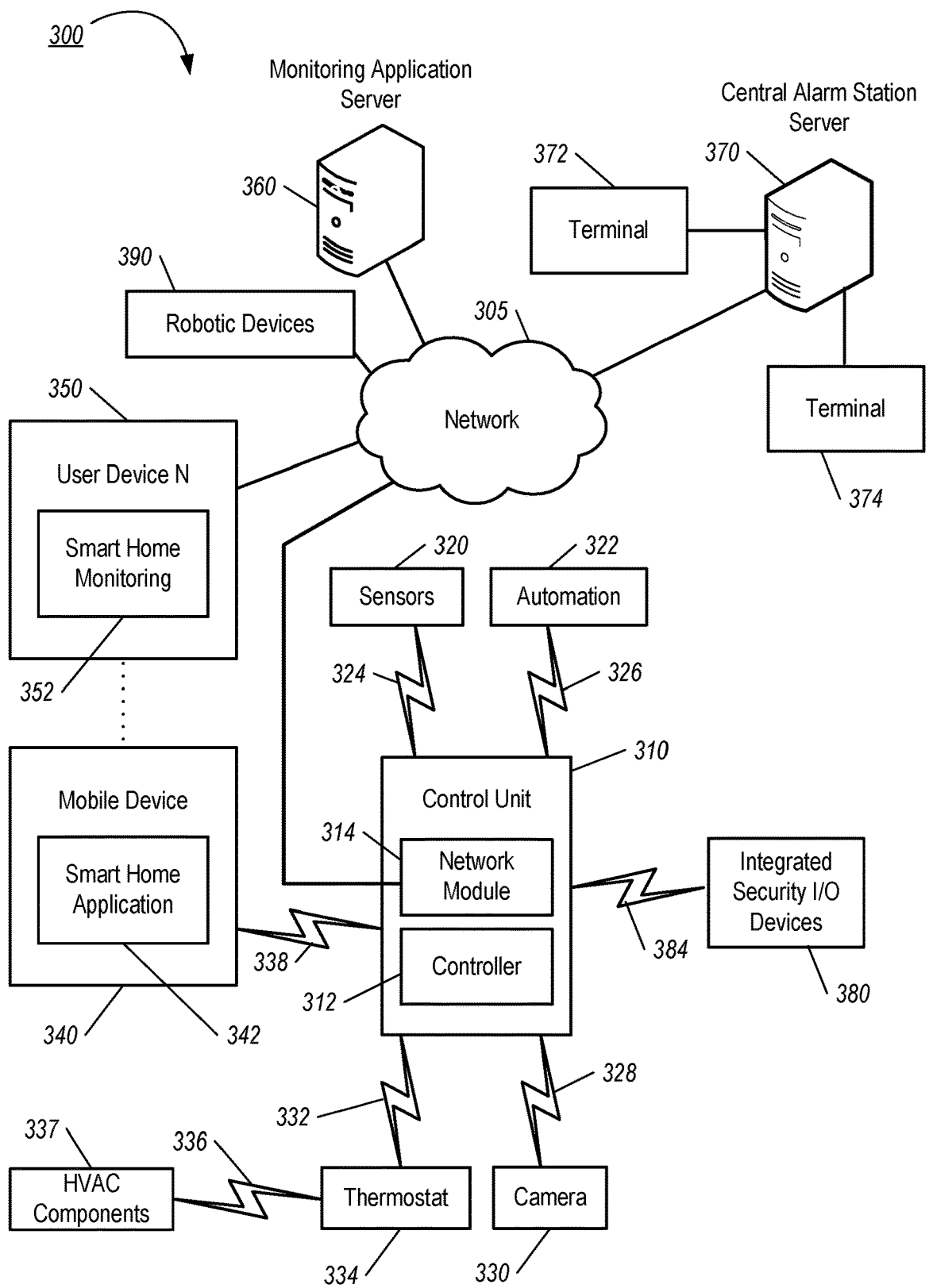
FIG. 3 is a diagram illustrating an example of a home monitoring system.

FIG. 3 is a diagram illustrating an example of a home monitoring system 300. The monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 can be configured to enable exchange of electronic communications between the control unit 310, the one or more user devices 340 and 350, the monitoring server 360, and the central alarm station server 370. The network 305 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 can include multiple networks or subnetworks, each of which can include, for example, a wired or wireless data pathway. The network 305 can include a circuit-switched network, a packet-switched data network, or any other network able to carry electronic communications (e.g., data or voice communications). For example, the network 305 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 305 can include one or more networks that include wireless data channels and wireless voice channels. The network 305 can be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 can include a processor or other control circuitry configured to execute instructions of a program that controls operation of a control unit system. In these examples, the controller 312 can be configured to receive input from sensors, flow meters, or other devices included in the control unit system and control operations of devices included in the household (e.g., speakers, lights, doors, etc.). For example, the controller 312 can be configured to control operation of the network module 314 included in the control unit 310.

The network module 314 is a communication device configured to exchange communications over the network 305. The network module 314 can be a wireless communication module configured to exchange wireless communications over the network 305. For example, the network module 314 can be a wireless communication device configured to exchange communications over a wireless data channel and a wireless voice channel. In this example, the network module 314 can transmit alarm data over a wireless data channel and establish a two-way voice communication session over a wireless voice channel. The wireless communication device can include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also can be a wired communication module configured to exchange communications over the network 305 using a wired connection. For instance, the network module 314 can be a modem, a network interface card, or another type of network interface device. The network module 314 can be an Ethernet network card configured to enable the control unit 310 to communicate over a local area network and/or the Internet. The network module 314 also can be a voice band modem configured to enable the alarm panel to communicate over the telephone lines of Plain Old Telephone Systems (POTS).

The control unit system that includes the control unit 310 includes one or more sensors. For example, the monitoring system can include multiple sensors 320. The sensors 320 can include a lock sensor, a contact sensor, a motion sensor, or any other type of sensor included in a control unit system. The sensors 320 also can include an environmental sensor, such as a temperature sensor, a water sensor, a rain sensor, a wind sensor, a light sensor, a smoke detector, a carbon monoxide detector, an air quality sensor, etc. The sensors 320 further can include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 can be connected to one or more lighting systems and can be configured to control operation of the one or more lighting systems. In addition, the home automation controls 322 can be connected to one or more electronic locks at the home and can be configured to control operation of the one or more electronic locks (e.g., control Z-Wave locks using wireless communications in the Z-Wave protocol). Further, the home automation controls 322 can be connected to one or more appliances at the home and can be configured to control operation of the one or more appliances. The home automation controls 322 can include multiple modules that are each specific to the type of device being controlled in an automated manner. The home automation controls 322 can control the one or more devices based on commands received from the control unit 310. For instance, the home automation controls 322 can cause a lighting system to illuminate an area to provide a better image of the area when captured by a camera 330.

The camera 330 can be a video/photographic camera or other type of optical sensing device configured to capture images. For instance, the camera 330 can be configured to capture images of an area within a building or home monitored by the control unit 310. The camera 330 can be configured to capture single, static images of the area and also video images of the area in which multiple images of the area are captured at a relatively high frequency (e.g., thirty images per second). The camera 330 can be controlled based on commands received from the control unit 310.

The camera 330 can be triggered by several different types of techniques. For instance, a Passive Infra-Red (PIR) motion sensor can be built into the camera 330 and used to trigger the camera 330 to capture one or more images when motion is detected. The camera 330 also can include a microwave motion sensor built into the camera and used to trigger the camera 330 to capture one or more images when motion is detected. The camera 330 can have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 can receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor can be used to determine if illumination is desired and can result in increased image quality.

The camera 330 can be programmed with any combination of time/day schedules, system "arming state", or other variables to determine whether images should be captured or not when triggers occur. The camera 330 can enter a low-power mode when not capturing images. In this case, the camera 330 can wake periodically to check for inbound messages from the controller 312. The camera 330 can be powered by internal, replaceable batteries if located remotely from the control unit 310. The camera 330 can employ a small solar cell to recharge the battery when light is available. Alternatively, the camera 330 can be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 can be any type of robots that are capable of moving and taking actions that assist in home monitoring. For example, the robotic devices 390 can include drones that are capable of moving throughout a home based on automated control technology and/or user input control provided by a user. In this example, the drones can be able to fly, roll, walk, or otherwise move about the home. The drones can include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 can be devices that are intended for other purposes and merely associated with the system 300 for use in appropriate circumstances. For instance, a robotic vacuum cleaner device can be associated with the monitoring system 300 as one of the robotic devices 390 and can be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 can navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 can include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 can store data that describes attributes of the home. For instance, the robotic devices 390 can store a floorplan and/or a three-dimensional model of the home that enables the robotic devices 390 to navigate the home. During initial configuration, the robotic devices 390 can receive the data describing attributes of the home, determine a frame of reference to the data (e.g., a home or reference location in the home), and navigate the home based on the frame of reference and the data describing attributes of the home. Further, initial configuration of the robotic devices 390 also can include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 can learn and store the navigation patterns such that the robotic devices 390 can automatically repeat the specific navigation actions upon a later request.

In some examples, the robotic devices 390 can include data capture and recording devices. In these examples, the robotic devices 390 can include one or more cameras, one or more motion sensors, one or more microphones, one or more biometric data collection tools, one or more temperature sensors, one or more humidity sensors, one or more air flow sensors, and/or any other types of sensors that can be useful in capturing monitoring data related to the home and users in the home. The one or more biometric data collection tools can be configured to collect biometric samples of a person in the home with or without contact of the person. For instance, the biometric data collection tools can include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 can include output devices. In these implementations, the robotic devices 390 can include one or more displays, one or more speakers, and/or any type of output devices that allow the robotic devices 390 to communicate information to a nearby user.

The robotic devices 390 also can include a communication module that enables the robotic devices 390 to communicate with the control unit 310, each other, and/or other devices. The communication module can be a wireless communication module that allows the robotic devices 390 to communicate wirelessly. For instance, the communication module can be a Wi-Fi module that enables the robotic devices 390 to communicate over a local wireless network at the home. The communication module further can be a 900 MHz wireless communication module that enables the robotic devices 390 to communicate directly with the control unit 310. Other types of short-range wireless communication protocols, such as Bluetooth, Bluetooth LE, Z-wave, Zigbee, etc., can be used to allow the robotic devices 390 to communicate with other devices in the home. In some implementations, the robotic devices 390 can communicate with each other or with other devices of the system 300 through the network 305.

The robotic devices 390 further can include processor and storage capabilities. The robotic devices 390 can include any suitable processing devices that enable the robotic devices 390 to operate applications and perform the actions described throughout this disclosure. In addition, the robotic devices 390 can include solid-state electronic storage that enables the robotic devices 390 to store applications, configuration data, collected sensor data, and/or any other type of information available to the robotic devices 390.

The robotic devices 390 are associated with one or more charging stations. The charging stations can be located at predefined home base or reference locations in the home. The robotic devices 390 can be configured to navigate to the charging stations after completion of tasks needed to be performed for the monitoring system 300. For instance, after completion of a monitoring operation or upon instruction by the control unit 310, the robotic devices 390 can be configured to automatically fly to and land on one of the charging stations. In this regard, the robotic devices 390 can automatically maintain a fully charged battery in a state in which the robotic devices 390 are ready for use by the monitoring system 300.

The charging stations can be contact based charging stations and/or wireless charging stations. For contact based charging stations, the robotic devices 390 can have readily accessible points of contact that the robotic devices 390 are capable of positioning and mating with a corresponding contact on the charging station. For instance, a helicopter type robotic device can have an electronic contact on a portion of its landing gear that rests on and mates with an electronic pad of a charging station when the helicopter type robotic device lands on the charging station. The electronic contact on the robotic device can include a cover that opens to expose the electronic contact when the robotic device is charging and closes to cover and insulate the electronic contact when the robotic device is in operation.

For wireless charging stations, the robotic devices 390 can charge through a wireless exchange of power. In these cases, the robotic devices 390 need only locate themselves closely enough to the wireless charging stations for the wireless exchange of power to occur. In this regard, the positioning needed to land at a predefined home base or reference location in the home can be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device can always use a first charging station and a second robotic device can always use a second charging station.

In some examples, the robotic devices 390 can share charging stations. For instance, the robotic devices 390 can use one or more community charging stations that are capable of charging multiple robotic devices 390. The community charging station can be configured to charge multiple robotic devices 390 in parallel. The community charging station can be configured to charge multiple robotic devices 390 in serial such that the multiple robotic devices 390 take turns charging and, when fully charged, return to a predefined home base or reference location in the home that is not associated with a charger. The number of community charging stations can be less than the number of robotic devices 390.

In addition, the charging stations can not be assigned to specific robotic devices 390 and can be capable of charging any of the robotic devices 390. In this regard, the robotic devices 390 can use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices can include any type of device used to provide alerts based on received sensor data. For instance, the one or more control units 310 can provide one or more alerts to the one or more integrated security input/output devices 380. Additionally, the one or more control units 310 can receive one or more sensor data from the sensors 320 and determine whether to provide an alert to the one or more integrated security input/output devices 380.

The sensors 320, the home automation controls 322, the camera 330, the thermostat 334, and the integrated security devices 380 can communicate with the controller 312 over communication links 324, 326, 328, 332, 338, and 384. The communication links 324, 326, 328, 332, 338, and 384 can be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 can continuously transmit sensed values to the controller 312, periodically transmit sensed values to the controller 312, or transmit sensed values to the controller 312 in response to a change in a sensed value.

The communication links 324, 326, 328, 332, 338, and 384 can include a local network. The sensors 320, the home automation controls 322, the camera 330, the thermostat 334, and the integrated security devices 380, and the controller 312 can exchange data and commands over the local network. The local network can include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network can be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 can be configured to monitor events generated by the control unit 310. In this example, the monitoring server 360 can exchange electronic communications with the network module 314 included in the control unit 310 to receive information regarding events detected by the control unit 310. The monitoring server 360 also can receive information regarding events from the one or more user devices 340 and 350.

In some examples, the monitoring server 360 can route alert data received from the network module 314 or the one or more user devices 340 and 350 to the central alarm station server 370. For example, the monitoring server 360 can transmit the alert data to the central alarm station server 370 over the network 305.

The monitoring server 360 can store sensor and image data received from the monitoring system and perform analysis of sensor and image data received from the monitoring system. Based on the analysis, the monitoring server 360 can communicate with and control aspects of the control unit 310 or the one or more user devices 340 and 350.

The monitoring server 360 can provide various monitoring services to the system 300. For example, the monitoring server 360 can analyze the sensor, image, and other data to determine an activity pattern of a resident of the home monitored by the system 300. In some implementations, the monitoring server 360 can analyze the data for alarm conditions or can determine and perform actions at the home by issuing commands to one or more of the controls 322, possibly through the control unit 310.

The monitoring server 360 can be configured to provide information (e.g., activity patterns) related to one or more residents of the home monitored by the system 300. For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 can be configured to monitor alerting events generated by the control unit 310. In this example, the central alarm station server 370 can exchange communications with the network module 314 included in the control unit 310 to receive information regarding alerting events detected by the control unit 310. The central alarm station server 370 also can receive information regarding alerting events from the one or more user devices 340 and 350 and/or the monitoring server 360.

The central alarm station server 370 is connected to multiple terminals 372 and 374. The terminals 372 and 374 can be used by operators to process alerting events. For example, the central alarm station server 370 can route alerting data to the terminals 372 and 374 to enable an operator to process the alerting data. The terminals 372 and 374 can include general-purpose computers (e.g., desktop personal computers, workstations, or laptop computers) that are configured to receive alerting data from a server in the central alarm station server 370 and render a display of information based on the alerting data. For instance, the controller 312 can control the network module 314 to transmit, to the central alarm station server 370, alerting data indicating that a sensor 320 detected motion from a motion sensor via the sensors 320. The central alarm station server 370 can receive the alerting data and route the alerting data to the terminal 372 for processing by an operator associated with the terminal 372. The terminal 372 can render a display to the operator that includes information associated with the alerting event (e.g., the lock sensor data, the motion sensor data, the contact sensor data, etc.) and the operator can handle the alerting event based on the displayed information.

In some implementations, the terminals 372 and 374 can be mobile devices or devices designed for a specific function. Although FIG. 3 illustrates two terminals for brevity, actual implementations can include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 can be a cellular phone or a non-cellular locally networked device with a display. The user device 340 can include a cell phone, a smart phone, a tablet PC, a personal digital assistant ("PDA"), or any other portable device configured to communicate over a network and display information. For example, implementations can also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 can perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 can load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 can be a general-purpose computer (e.g., a desktop personal computer, a workstation, or a laptop computer) that is configured to communicate with the monitoring server 360 and/or the control unit 310 over the network 305. The user device 340 can be configured to display a smart home user interface 352 that is generated by the user device 340 or generated by the monitoring server 360. For example, the user device 340 can be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations can include more (and, perhaps, many more) or fewer user devices.

In some implementations, the one or more user devices 340 and 350 communicate with and receive monitoring system data from the control unit 310 using the communication link 338. For instance, the one or more user devices 340 and 350 can communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 can connect locally to the monitoring system and its sensors and other devices. The local connection can improve the speed of status and control communications because communicating through the network 305 with a remote server (e.g., the monitoring server 360) can be significantly slower.

Although the one or more user devices 340 and 350 are shown as communicating with the control unit 310, the one or more user devices 340 and 350 can communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 can receive the data from the control unit 310 through the network 305 or the monitoring server 360 can relay data received from the control unit 310 to the one or more user devices 340 and 350 through the network 305. In this regard, the monitoring server 360 can facilitate communication between the one or more user devices 340 and 350 and the monitoring system.

In some implementations, the one or more user devices 340 and 350 can be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 can transmit the images captured by the camera 330 over a wireless WAN network to the user devices 340 and 350. Because transmission over a wireless WAN network can be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system can be used to enable/disable video/image recording devices (e.g., the camera 330). In these implementations, the camera 330 can be set to capture images on a periodic basis when the alarm system is armed in an "away" state, but set not to capture images when the alarm system is armed in a "home" state or disarmed. In addition, the camera 330 can be triggered to begin capturing images when the alarm system detects an event, such as an alarm event, a door-opening event for a door that leads to an area within a field of view of the camera 330, or motion in the area within the field of view of the camera 330. In other implementations, the camera 330 can capture images continuously, but the captured images can be stored or transmitted over a network when needed.

The described systems, methods, and techniques can be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device.

Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed ASICs (application-specific integrated circuits).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   receiving, from a camera, a first video clip indicative of an event;
   determining, from the first video clip, a category for the first video clip;
   determining, for the first video clip and based on the category, a difference threshold;
   receiving, from the camera, a second video clip;
   determining, for the first video clip and the second video clip, a difference score; and
   in response to determining that the difference score for the first video clip and the second video clip meets the difference threshold, providing an alert.

2. The method of claim 1, wherein determining, from the first video clip, a category for the first video clip comprises:
   determining an action being performed by a human in the first video clip; and
   determining the category for the first video clip based on the action being performed by the human.

3. The method of claim 1, wherein determining an action being performed by a human in the first video clip comprises:
   identifying a particular object in the first video clip;
   determining that the human is interacting with the particular object in the first video clip; and
   determining the action being performed by the human in the first video clip based on the particular object with which the human was determined to be interacting.

4. The method of claim 1, wherein determining, for the first video clip and the second video clip, a difference score comprises:
   determining that a human present in the second video clip was not present in the first video clip; and
   based on determining that the human present in the second video clip was not present in the first video clip, determining the difference score.

5. The method of claim 1, wherein determining, for the first video clip and the second video clip, a difference score comprises:
   determining, from the second video clip, a second category for the second video clip; and
   determining the difference score based on a difference between the category for the first video clip and the second category for the second video clip.

6. The method of claim 1, wherein determining, for the first video clip and based on the category, a difference threshold comprises:
   determining a risk level based on the category; and
   determining the difference threshold based on the risk level.

7. The method of claim 6, wherein determining the difference threshold based on the risk level comprises:
   determining, from the first video clip, a second category for the first video clip;
   determining a second risk level based on the second category; and
   determining the difference threshold based on the risk level and the second risk level.

8. The method of claim 1, wherein the first video clip and the second video clip are both a predetermined duration.

9. A system comprising:
   one or more computers and one or more storage devices storing instructions that are operable, when executed by the one or more computers, to cause the one or more computers to perform operations comprising:
   maintaining, for each of a plurality of categories for content detected in respective video clips, a corresponding difference threshold, a plurality of difference thresholds including the corresponding difference thresholds at least some of which have different values than another difference threshold;
   receiving, from a camera, a first video clip indicative of an event;

determining, from the plurality of categories and using the first video clip, a category for content depicted in the first video clip;

determining, for the first video clip and using the category, a difference threshold from the plurality of difference thresholds;

receiving, from the camera, a second video clip;

determining, for the first video clip and the second video clip, a difference score that represents a difference between at least a first portion of the first video clip and at least a second portion of the second video clip;

determining whether the difference score for the first video clip and the second video clip satisfies the difference threshold; and in response to determining that the difference score for the first video clip and the second video clip satisfies the difference threshold, providing an alert.

10. The system of claim 9, wherein determining, from the first video clip, a category for the first video clip comprises:

determining an action being performed by a human in the first video clip; and determining the category for the first video clip based on the action being performed by the human.

11. The system of claim 9, wherein determining an action being performed by a human in the first video clip comprises:

identifying a particular object in the first video clip;

determining that the human is interacting with the particular object in the first video clip; and determining the action being performed by the human in the first video clip based on the particular object with which the human was determined to be interacting.

12. The system of claim 9, wherein determining, for the first video clip and the second video clip, a difference score comprises:

determining that a human present in the second video clip was not present in the first video clip; and based on determining that the human present in the second video clip was not present in the first video clip, determining the difference score.

13. The system of claim 9, wherein determining, for the first video clip and the second video clip, a difference score comprises:

determining, from the second video clip, a second category for the second video clip; and determining the difference score based on a difference between the category for the first video clip and the second category for the second video clip.

14. The system of claim 9, wherein determining, for the first video clip and based on the category, a difference threshold comprises:

determining a risk level based on the category; and determining the difference threshold based on the risk level.

15. The system of claim 14, wherein determining the difference threshold based on the risk level comprises:

determining, from the first video clip, a second category for the first video clip;

determining a second risk level based on the second category; and determining the difference threshold based on the risk level and the second risk level.

16. The system of claim 9, wherein the first video clip and the second video clip are both a predetermined duration.

17. A non-transitory computer-readable medium storing software comprising instructions executable by one or more computers which, upon such execution, cause the one or more computers to perform operations comprising:

receiving, from a camera, a first video clip indicative of an event;

determining, from the first video clip, a category for the first video clip;

determining, for the first video clip and based on the category, a difference threshold, wherein determining the difference threshold comprises:

determining a risk level based on the category; and determining the difference threshold based on the risk level;

receiving, from the camera, a second video clip;

determining, for the first video clip and the second video clip, a difference score, wherein determining the difference score comprises:

determining, from the second video clip, a second category for the second video clip;

determining that a human present in the second video clip was not present in the first video clip; and based on (i) a difference between the category for the first video clip and the second category for the second video clip and (ii) determining that the human present in the second video clip was not present in the first video clip, determining the difference score; and in response to determining that the difference score for the first video clip and the second video clip meets the difference threshold, providing an alert.

18. The medium of claim 17, wherein determining, from the first video clip, a category for the first video clip comprises:

determining an action being performed by a human in the first video clip; and determining the category for the first video clip based on the action being performed by the human.

19. The medium of claim 17, wherein determining an action being performed by a human in the first video clip comprises:

identifying a particular object in the first video clip;

determining that the human is interacting with the particular object in the first video clip; and determining the action being performed by the human in the first video clip based on the particular object with which the human was determined to be interacting.

* * * * *